United States Patent
Brar et al.

(10) Patent No.: US 9,571,421 B1
(45) Date of Patent: Feb. 14, 2017

(54) FUSED DATA CENTER FABRICS

(71) Applicant: Amazon Technologies, Inc., Reno, NV (US)

(72) Inventors: Jagwinder Singh Brar, Bellevue, WA (US); Michael David Marr, Monroe, WA (US); Tyson J. Lamoreaux, Seattle, WA (US); Mark N. Kelly, Dublin (IE); Justin O. Pietsch, Bothell, WA (US)

(73) Assignee: Amazon Technologies, Inc., Reno ( * ) Notice: Subject to any disclaimer, the term of this patent is extended or adjusted under 35 U.S.C. 154(b) by 604 days.

(21) Appl. No.: 14/047,894

(22) Filed: Oct. 7, 2013

Related U.S. Application Data

(62) Division of application No. 12/826,597, filed on Jun. 29, 2010, now Pat. No. 8,554,952.

(51) Int. Cl.
  *H04L 12/933* (2013.01)
  *H04L 12/947* (2013.01)
  *H04Q 11/00* (2006.01)

(52) U.S. Cl.
  CPC ........... *H04L 49/1515* (2013.01); *H04L 49/25* (2013.01); *H04Q 11/0005* (2013.01); *H04Q 2011/0058* (2013.01)

(58) Field of Classification Search
  CPC ............ H04Q 11/0005; H04Q 11/0062; H04Q 11/0067; H04Q 11/0071; H04Q 11/0478; H04Q 2011/0052; H04Q 2011/0075; H04L 49/15; H04L 41/12; H04L 49/1515; H04L 49/25
  See application file for complete search history.

(56) References Cited

U.S. PATENT DOCUMENTS

| | | | | |
|---|---|---|---|---|
| 6,567,429 B1 * | 5/2003 | DeMartino | ............. | H04J 14/02 370/395.64 |
| 6,980,537 B1 * | 12/2005 | Liu | ......................... | H04L 45/46 370/277 |
| 8,107,458 B1 * | 1/2012 | Ranganathan | .......... | H04L 41/12 370/254 |
| 8,489,718 B1 * | 7/2013 | Brar | ...................... | H04L 49/356 370/254 |

(Continued)

OTHER PUBLICATIONS

USPTO Notice of Allowance dated Jun. 25, 2013, for U.S. Appl. No. 12/826,597, 8 pages.

(Continued)

*Primary Examiner* — Backhean Tiv
(74) *Attorney, Agent, or Firm* — Hogan Lovells US LLP

(57) ABSTRACT

Efficient and highly-scalable network solutions are provided that each utilize deployment units based on Clos networks, but in an environment such as a data center of Internet Protocol-based network. Each of the deployment units can include multiple stages of devices, where connections between devices are only made between stages and the deployment units are highly connected. In some embodiments, the level of connectivity between two stages can be reduced, providing available connections to add edge switches and additional host connections while keeping the same number of between-tier connections. In some embodiments, where deployment units (or other network groups) can be used at different levels to connect other deployment units, the edges of the deployment units can be fused to reduce the number of devices per host connection.

13 Claims, 10 Drawing Sheets

(56) References Cited

U.S. PATENT DOCUMENTS

| | | | | |
|---|---|---|---|---|
| 8,495,194 | B1* | 7/2013 | Brar | H04L 49/356 |
| | | | | 370/216 |
| 8,942,232 | B1* | 1/2015 | Fermor | H04L 49/15 |
| | | | | 370/388 |
| 9,106,564 | B2* | 8/2015 | Marr | H04L 41/12 |
| 2003/0033399 | A1* | 2/2003 | Garnett | G06F 1/183 |
| | | | | 709/223 |
| 2010/0097934 | A1* | 4/2010 | Hendel | H04L 45/04 |
| | | | | 370/237 |
| 2010/0254703 | A1* | 10/2010 | Kirkpatrick | H04Q 11/0005 |
| | | | | 398/45 |
| 2011/0080855 | A1* | 4/2011 | Fung | H04L 45/04 |
| | | | | 370/256 |
| 2011/0087799 | A1* | 4/2011 | Padhye | H04L 12/6418 |
| | | | | 709/235 |
| 2011/0228767 | A1* | 9/2011 | Singla | H04L 49/00 |
| | | | | 370/389 |
| 2012/0250574 | A1* | 10/2012 | Marr | H04L 41/12 |
| | | | | 370/254 |
| 2015/0236980 | A1* | 8/2015 | Brar | H04L 49/15 |
| | | | | 370/400 |
| 2016/0057516 | A1* | 2/2016 | Hochberg | H04Q 11/0005 |
| | | | | 398/51 |

OTHER PUBLICATIONS

USPTO Non-Final Office Action dated Jan. 8, 2013, for U.S. Appl. No. 12/826,597, 11 pages.

\* cited by examiner

FUSED DATA CENTER FABRICS

CROSS REFERENCE TO RELATED APPLICATIONS

This application is a Divisional of, and accordingly claims the benefit of, U.S. patent application Ser. No. 12/826,597, filed with the U.S. Patent and Trademark Office on Jun. 29, 2010, which is hereby incorporated herein by reference.

BACKGROUND

As an increasing number of applications and services are being made available over networks such as the Internet, and increasingly utilizing sources such as networked data centers, an increasing number of content, application, and/or service providers are turning to technologies such as cloud computing and Web services. In such environments, the hardware and/or software used to provide access to data and/or electronic resources typically needs to be scalable to meet the needs of various users at any given time. A user or customer typically will rent, lease, or otherwise pay for access to resources, and thus does not have to purchase and maintain the hardware and/or software to provide access to these resources.

Various approaches exist that enable resources such as data centers and Internet-Protocol (IP)-based networks to scale as the needs of the various users and applications increase. In some cases, this requires the purchase of large, expensive hardware that typically provides more capacity than is immediately necessary. In other cases, less expensive hardware devices can be used, but in order to handle conventional routing protocols the number of devices needed to scale can be quite large and complex to install. For a large number of resources to be provided, this can provide a significant expenditure and overhead, which can be undesirable in many instances.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to connecting resources in an environment such as a data center, compute cloud, or Internet Protocol (IP)-based network. In particular, various embodiments utilize groups of network switches and/or other networking devices to provide an efficient and highly scalable network solution. The network can include a plurality of deployment units (or areas or Clos groups as discussed herein). Each of the deployment units can include multiple tiers of devices, where connections between devices are only made between tiers and the deployment units are highly connected. The deployment units can be based on Clos networks, wherein each deployment unit is fully connected.

In some embodiments, the level of connectivity between two tiers can be reduced, such that the devices of one tier are connected to less than all the devices of another tier. While this will result in groups that are not necessarily proper Clos networks, as there can be oversubscription and less than full connectivity, the groups still maintain many of the important properties of a Clos network. In one embodiment, this amounts to each spine switch only being connected to one egress switch. Since removing these connections will result in open ports on the spine switches, additional connections can be made to allow for the installation of additional edge switches in the deployment unit. As the edge switches typically connect to a number of host machines or other computing devices, this approach will increase the number of host connections that can be made by the deployment unit while not increasing the number of between-tier connections that need to be made. Such an approach can improve the efficiency of the network.

In other embodiments, where deployment units (or other network groups) can be used at different levels to connect other deployment units, the edges of the deployment units can be fused to reduce the number of devices and thus improve efficiency. In some embodiments, one or more egress switches of a lower level deployment unit can be "fused" with one or more edge switches of a higher level deployment unit, whereby a single switch can take the place of two switches per conventional network group approaches. In some cases, the fusing of edges of the deployment units can allow deployment units to be "stacked" like building blocks, providing for ease of scalability. By fusing, however, each block can include one less stage than would be used for conventional approaches.

Various other advantages and implementations are possible as discussed and suggested below with respect to the various embodiments.

Figure 1:
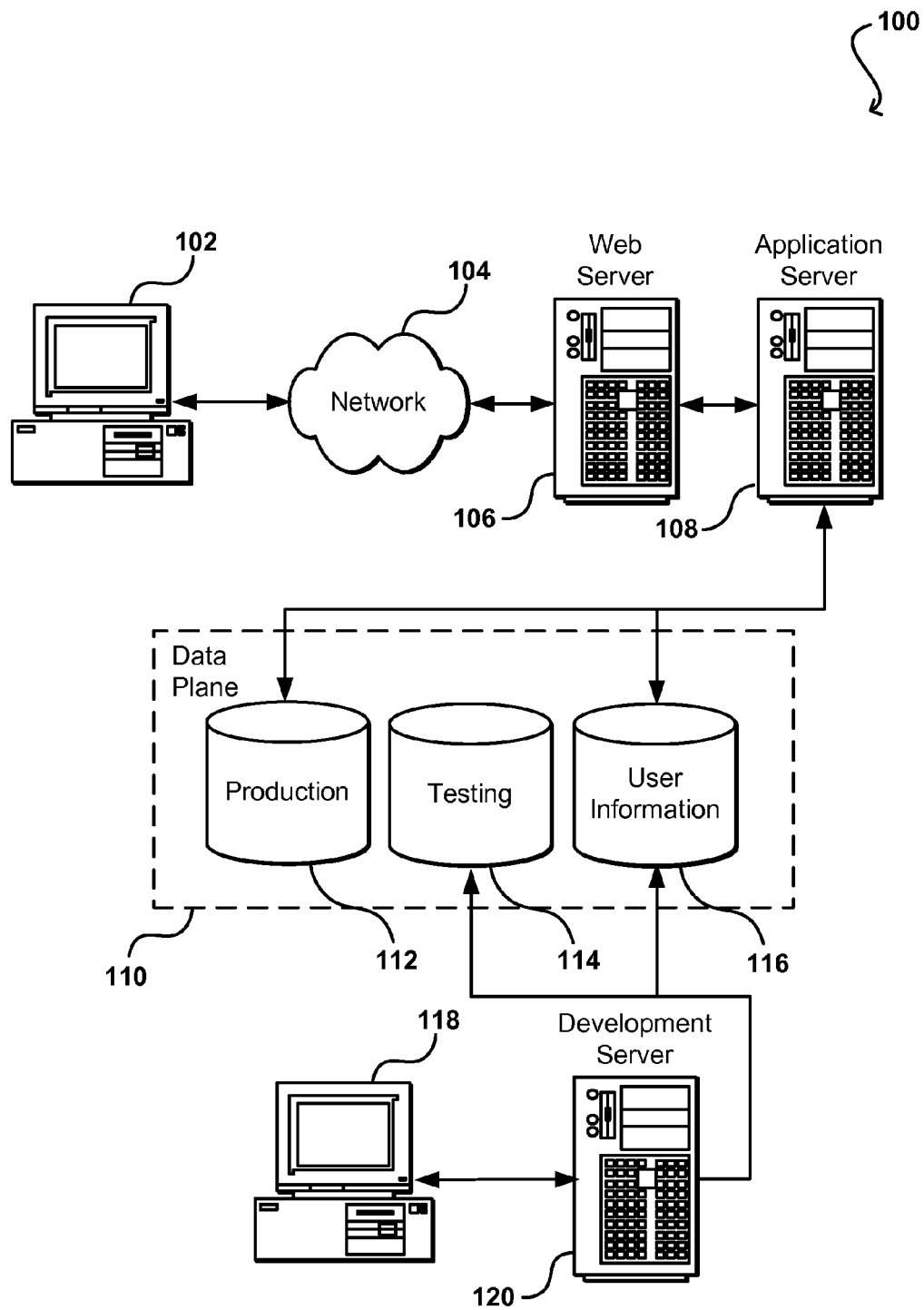
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or computing device as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for an electronic marketplace or compute cloud, for example, wherein multiple hosts might be used to perform tasks such as serving content, executing large-scale computations, or performing any of a number of other such tasks. Some of these hosts may be configured to offer the same functionality, while other servers might be configured to perform at least some different functions. The hosts can be grouped together into clusters or other functional groups for the performance of specific tasks, such as may be provided as part of a data center, cloud computing offering, or processing service. The electronic environment in such cases might include additional components and/or other arrangements, such as those illustrated in the configuration 200 of FIG. 2, discussed in detail below.

Figure 2:
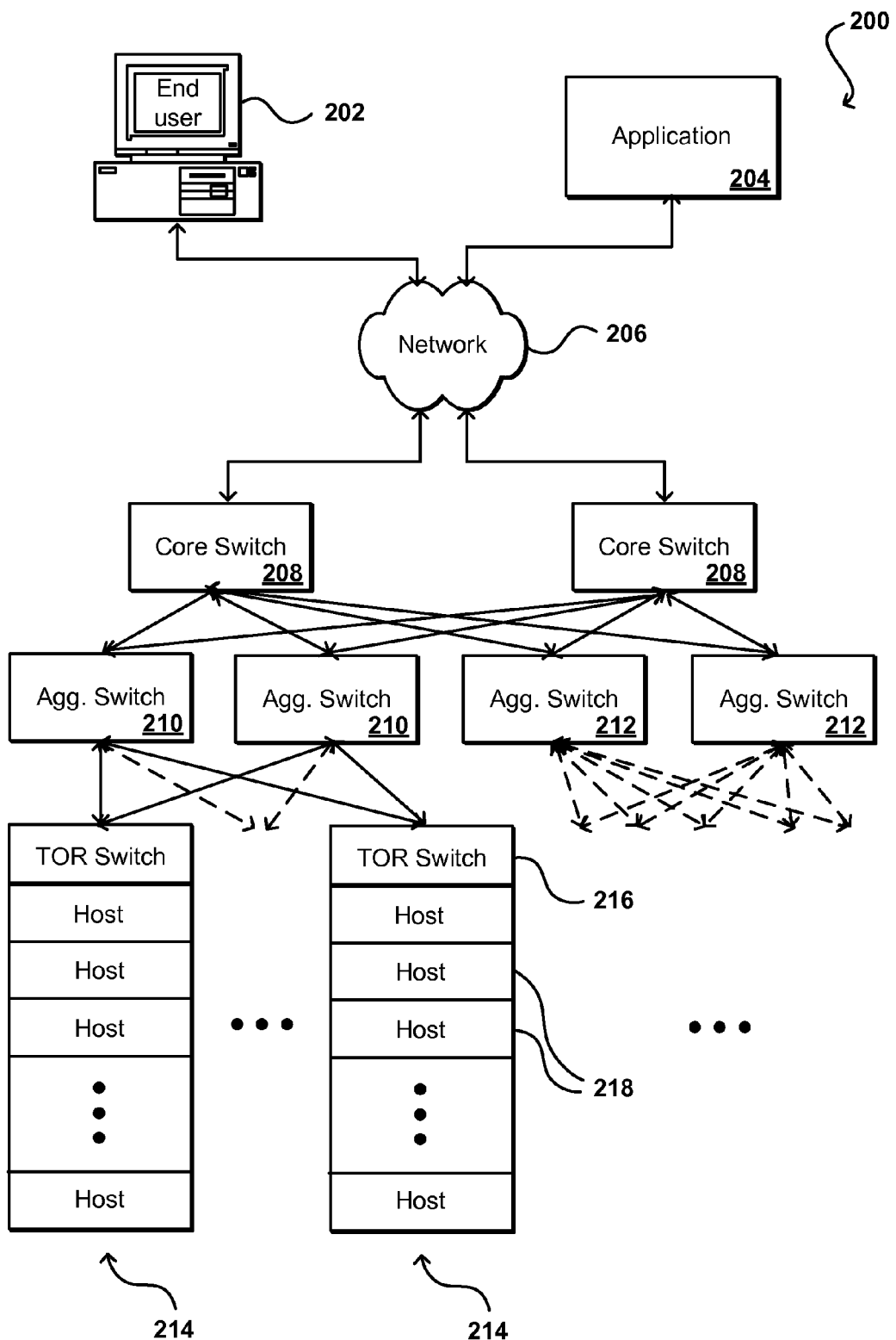
FIG. 2 illustrates an example of a highly connected network design that can be used in accordance with various embodiments.

For example, FIG. 2 illustrates an example configuration 200 that represents a traditional hierarchical network design that can be used to route requests to specific host machines or other such devices, in order to provide users or applications with access to a variety of distributed resources. This example shows a typical design that can be used for a data center, wherein a source such as an end user device 202 or application 204 is able to send requests across a network 206, such as the Internet, to be received by one or more components of the data center. Properties of various components of the network, such as provisioned instances, etc., can be managed using at least one management system, component, or service 220. In this example, the requests are received over the network to one of a plurality of core switches 208, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 208 is able to communicate with each of a plurality of aggregation switches 210, 212, which in at least some embodiments are utilized in pairs. Utilizing aggregation switches in pairs provides a redundant capability in case one or the switches experiences a failure or is otherwise unavailable, such that the other device can route traffic for the connected devices. Each pair of aggregation switches 210, 212 is linked to a plurality of physical racks 214, each of which typically contains a top of rack (TOR) or "access" switch 216 and a plurality of physical host machines 218, such as data servers and other processing devices. As shown, each aggregation switch can be connected to a number of different racks, each with a number of host machines. The links between the layers can each comprise redundant links, or link pairs, with separate links for inbound and outbound traffic. If the network utilizes redundant 1 Gigabit Ethernet (GbE) links, for example, the total bandwidth per redundant link is 2 GbE.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as 120 racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 206. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting thirty-six hosts in a physical rack, for example, each of three switches in the rack can act as a local TOR switch for a "logical" rack (a sub-rack of a physical rack or logical grouping of devices (hosts and/or switches) from multiple racks), with each local TOR switch connecting twelve of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each local TOR switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

The connectivity approach used for such a network can vary between embodiments. For example, FIGS. 3(*a*) and 3(*b*) illustrate a design based on a Clos network approach, wherein there are twenty-one racks each with at least one TOR switch (actual or local), and each of the TOR switches is connected to an array of twelve spine switches, which typically will be located in another physical rack. The array of spine switches corresponds to a "center" stage in a traditional Clos network design. Since there are twelve hosts, there are twelve "up" connections and twelve "down" connections to the spine switches. The design thus provides a high radix network based on a re-arrangeably non-blocking Clos network.

Figure 3A:
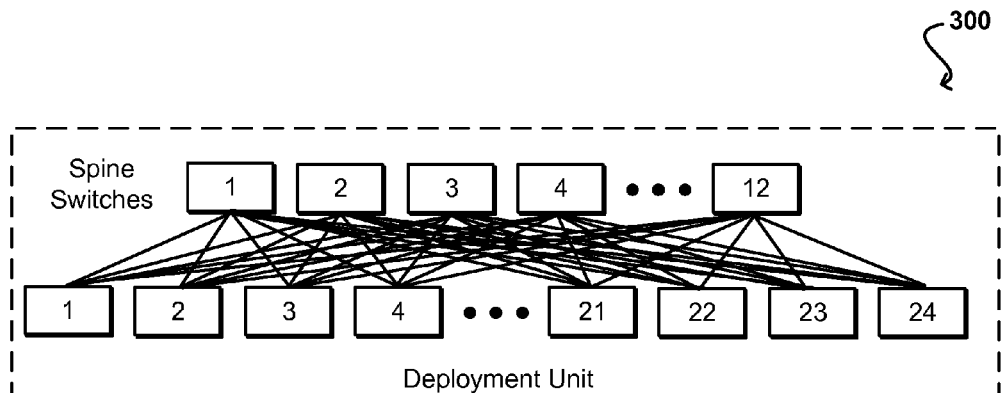
FIGS. 3(a) and 3(b) illustrate views of a Clos network style deployment unit that can be utilized in accordance with various embodiments.

The design presented illustrates a two-tier folded Clos network. As seen in the configuration 300 of FIG. 3(*a*), there are effectively two layers of switches: a layer of spine switches and a layer of edge switches. Three of the edge switches, however, can be utilized as egress switches which pass data on to the network. FIG. 3(*b*) thus illustrates a logical arrangement 350 of the switches, herein referred to as a "deployment unit," showing the three edge switches as egress switches which sit at the "top" of the group of switches and pass data "up and out" of the deployment unit. Each of the twelve spine switches can be thought of as having a port out the logical "back" side to one of the three egress switches, but the three switches are simply one of the twenty-four edge servers illustrated in a folded representation. The egress switches simply have the only connections out of the deployment unit, while the remaining edge switches have connections to underlying devices. All traffic into and out of the deployment unit thus is routed through one of the three egress switches, although different numbers of switches can be used in different embodiments.

Even though the network may appear similar to the traditional core switch-based design of FIG. 2, the spine switches in this design function as core switches, but do not have any outbound connectivity. The layers of the deployment unit have fully meshed connectivity, however, provided by the spine switches. The deployment unit without the egress switches would function as a standalone network without any external connectivity. Thus, some of the edge switches can be utilized as egress switches as illustrated. Otherwise, the fact that some of the edge switches are illustrated on the top layer and some on the bottom layer is meaningless from a network connectivity perspective with respect to the spine switches and the other edge switches, and there is very symmetric behavior. The data within the deployment unit can be pushed through a number of equidistant, fault-tolerant paths, providing the re-arrangably non-blocking behavior. With the paths being symmetric and equidistant, all the switches can follow the same routing protocol and spread the traffic evenly without a lot of overhead or additional logic. Further, the deployment units can be replicated multiple times within a data center, for example, wherein a Clos-style network effectively manages traffic across all of the deployment units in the data center.

An advantage of a high radix network or similar fat tree design is that the network can easily be scaled by adding additional deployment units, each connected using an aggregation fabric such as is described with respect to FIG. 2. A potential downside, however, is that the number of devices needed to scale the deployment units can increase very quickly, which can significantly increase the cost of the network. In an example where large data switches in a network are replaced with a design utilizing commodity switches in a high radix or other such implementation, the number of devices increases from around fifteen switches to on the order of seven hundred to eight hundred switches. Commodity switches as used herein generally refer not only to mass-produced, off-the-shelf switches, but also refer to switches built by low cost Just-In-Time (JIT) or on-demand manufacturers, typically using "merchant silicon" or other relatively low-cost materials. Commodity switches typically are relatively simple, although more complex proprietary switches can be included as well.

Replacing the large switches with a number of smaller commodity switches in this example, however, increases the number of Layer 3 switches that speak the appropriate routing protocol on the order of about fifty times in one embodiment. Further, each of the switches will have to obtain information about all the other switches in the data center, as well as information about all the host devices connected to those switches, such that the amount of information that each switch needs to obtain and process is much higher than in certain conventional designs. Thus, while a high radix interconnection network provides advantages such as ease of scalability and high bandwidth capability, as well as a chance for significant cost savings, the complexity of the routing protocol grows on the order of $n^2$ for a two-tier Clos-based network design, and on the order of $n^4$ for a three-tier Clos-based network, where n is the number of ports on the devices used in each tier. For a large number of hosts, this can provide a significant expenditure and overhead, which can be undesirable in many instances.

Figure 3B:
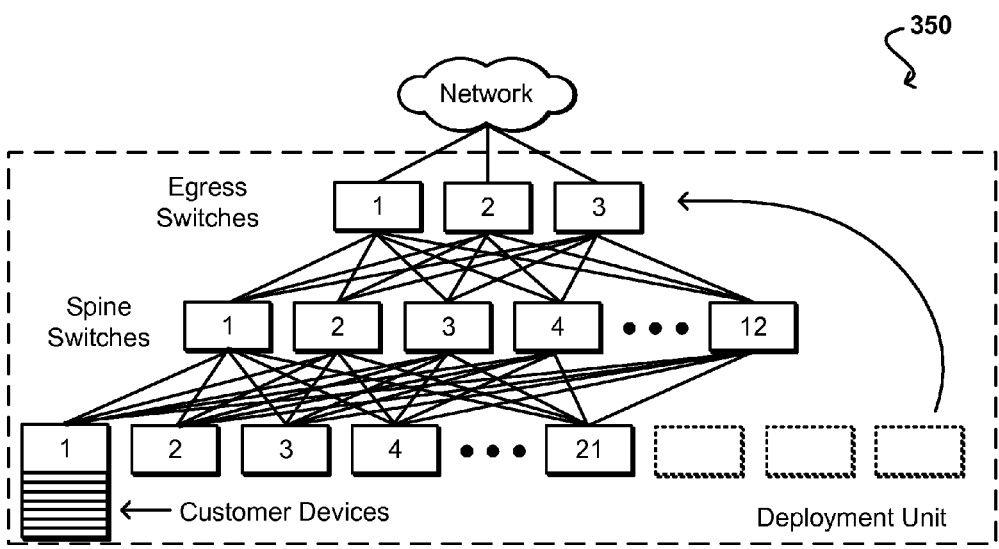
Figure 4A:
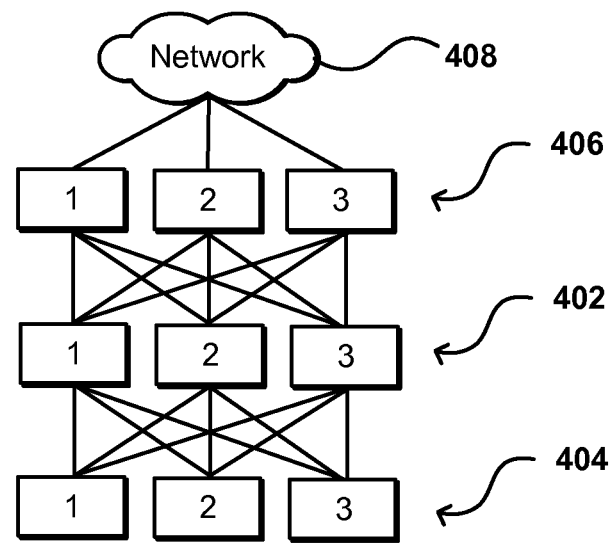
FIGS. 4(a) and 4(b) illustrate Clos-based network groups with different levels of oversubscription that can be used in accordance with various embodiments.

FIG. 4(a) illustrates a traditional three-stage, two-tier Clos network configuration 400 in an "unfolded" view, similar to that shown in FIG. 3(b), here based on six-port switches wherein there are half the number of spine switches 402 as there are edge 404 or "leaf" switches, and wherein half of the edge switches function as egress switches 406. The Clos network is highly connected, as each device in each tier is connected to each device in an adjacent tier. The devices of both tiers thus are fully connected, with no intra-tier connections within a tier. If all the available ports on all the edge switches were used to make host connections, there would be no connection out of the Clos network. Thus, as discussed previously, connections to an external network 408 typically would be made using the available ports of the egress switches 406. In some cases, at least some of the egress switches are used to connect to devices that sit between the Clos network and the external network, such as a set of core switches and/or an aggregation fabric. As can be seen, however, the tier 2 devices (here spine switches) never make connections to anything but tier 1 devices (here edge or egress switches). Thus, in order to route host traffic out to the external network, the host would communicate with an edge switch, which would communicate to a spine switch, which would communicate with an egress switch, which would pass the communication to the external network. The three communications correspond to the three stages of the Clos network. As should be understood, there can be any appropriate number of tiers in a Clos network using any appropriate type of switches, such as twelve, twenty-four, or forty-eight port switches. The number of devices in each tier can depend at least in part upon the number of ports, as a traditional Clos is fully connected and non-blocking, and does not have oversubscription at any tier. While figures with limited numbers of devices are shown for purposes of simplicity and explanation, it should be understood that the basic concepts apply and scale accordingly.

A potential downside to conventional Clos networks is that the networks can be very expensive to scale due to factors such as full connectivity and 1:1 oversubscription. For devices with many ports, there will be many more spine switches that must connect to each of the edge and egress devices. By not having any oversubscription at any level, the overhead (e.g., based on the number of switches) per host device can be prohibitively large. The efficiency of a data center can be measured in one respect by comparing the number of available host connections to the number of devices used to provide the networking fabric. Another efficiency measurement looks at the network costs (e.g., based on the number of cables and switches) per number of host connections available.

Figure 4B:
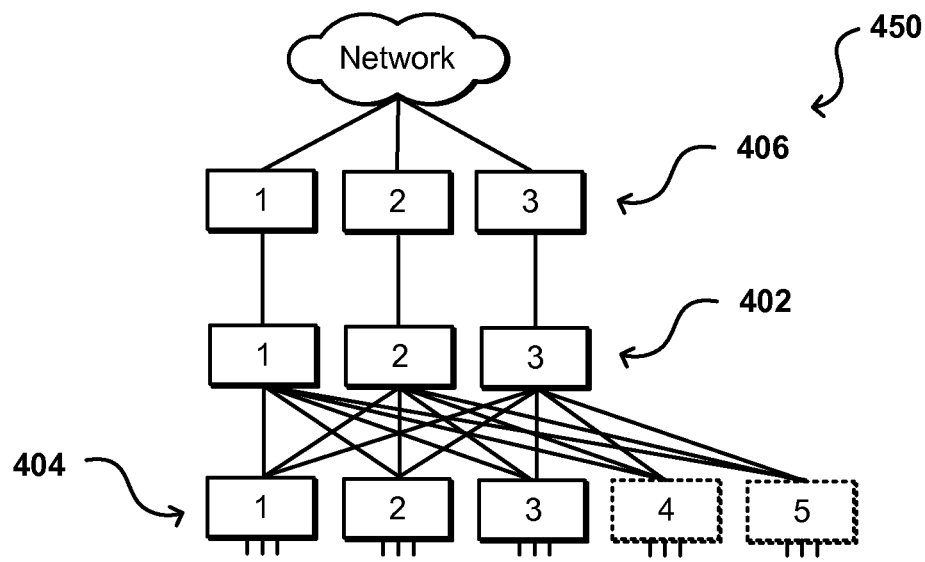

An approach in accordance with various embodiments can improve the efficiency of Clos-based data centers, making the networks more realistic in scale. The approach introduces oversubscription between the spine switches and the egress switches, such as is shown in the configuration 450 of FIG. 4(b). In this example, the number of "up" connections between the tier 2 spine switches 402 and the tier 1 egress switches 406 is reduced, with each spine switch 402 only being connected to one respective egress switch 406. In other embodiments, each spine switch can be connected to less than the total number of egress switches, etc. By reducing the number of connections up to the egress switches, each spine switch will have one or more open ports (two available ports in this example) that can be used to make "down" connections to additional tier 1 edge switches 404, each of which will have additional host connections 452 available for connecting additional host machines or other such devices. By introducing 5:1 oversubscription in the example (with each spine switch having one connection to the egress switch stage and five connections to the edge switch stage) the number of host connections has increased on the order of 60% while only increasing the cost of the network by about 10% due to the cost for additional devices. The efficiency of the network thus has increased accordingly. Such a design also can be recursed to develop larger networks, such as a four-tier network with the same or similar design principles.

Figure 5A:
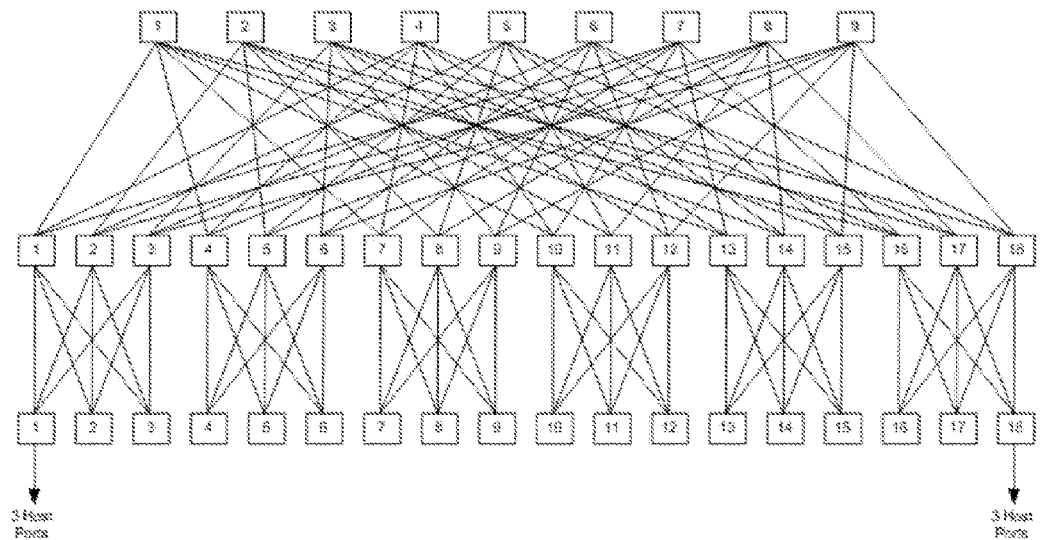
FIGS. 5(a) and 5(b) illustrates a traditional three-tier Clos network and a network of Clos groups, respectively, that can be used in accordance with various embodiments.

In a conventional Clos network, such as the conventional three-tier Clos network illustrated in FIG. 5(a), there would only be three edge devices in each deployment unit in the first tier. There are three "up" connections for each edge device as illustrated. It is possible, however, to accomplish connectivity using only a single up connection from each spine switch. If a single up connection is used, the extra unused connections on the second tier devices can be used to enable additional edge switches in the first tier. The total number of between-tier connections would be the same, as each device would still be utilizing all ports (six in this example) for routing host traffic. The total number of devices has increased, as well as the available number of host ports as a result of those additional edge devices. The necessary size of the overall deployment has been reduced, however, as an additional number ports can be provided using the same number of switches.

As seen in the configuration 500 of FIG. 5(*b*), wherein a network includes multiple deployment units, each deployment unit 502, 504 (or at least a portion of the units) can have oversubscription introduced to enable the introduction of additional edge devices. As with a conventional three-tier Clos, multiple deployment units can be introduced up to the number of connections that are available from the tier 3 devices 506. In this example there can be up to six connections for each of the devices, such that the deployment unit can be replicated up to six times. All connections are still made between tiers, with all devices in tiers 1 and 2 being fully connected. The connections 510 to the network are shown as broken lines in FIG. 5(*b*), as the links to the rest of the network can include additional components between the switches shown and the network, such as at least a layer of edge switches between the tier 3 switches and the network. In this example, the devices of tier 3 represent the cross-bar, or the point of connectivity between deployment units. In a conventional Clos network there would be several connections 508, such as triple-replicated connections, but in this configuration there is no such replication. There is only one connection from each tier 2 device in a deployment unit to each tier 3 device in the crossbar 506. When the number of (redundant) connections up to tier 3 is reduced (the "removed" connections illustrated by dotted lines 508), additional devices (e.g., devices 4 and 5 in each deployment unit) can be added to tier 1 in each deployment unit using the available ports/connections as a result of removing the connections between tiers 2 and 3. Reducing the number of connections up to the tier 3 switches also enables the addition of the second deployment unit and, as indicated, will permit the addition of as many deployment units as there are ports (e.g., 6 or 6-n, where n is the number of connections made to the rest of the network). As should be apparent, the connections to tier 3 are all between-tier connections, but utilize a different connectivity solution than the fully connected solution used between tiers 1 and 2.

A potentially significant advantage of utilizing such design principles is that the layout of a network (e.g., data center) can be determined mathematically based on specific constraints, such as a desired number of host connections and desired level of efficiency. The design principles utilized can include, for example, fully connecting tiers within a deployment unit, only utilizing connections between tiers, selecting a connectivity solution for each crossbar, etc. The design also can depend on other factors discussed elsewhere herein. For example, the number of switches in the top layer of the deployment unit can be up to half the number of ports on each device, such that 24-port switches there can be up to twelve devices in the top layer, and for 6-port devices there can be up to three devices in the top layer. And there can be a very clear demarcation of tiers throughout the data center, where the tiers are regular and/or consistent between deployment units and wherein traffic always moves according to a regular approach within the data center, such as always going from tier to tier along a path with a similar number of connections. Such an approach has added benefits, as the data center can guarantee aspects such as the lack of looping paths, consistent path lengths, etc.

A further advantage is that such a connectivity approach can retain many of the benefits of a traditional Clos network, while reducing the need for additional devices to scale. Such an approach also can prevent the providing of multiple full bandwidth connections that might not actually be needed a majority of the time. Various levels of oversubscription can be introduced while retaining many aspects of a Clos network. Further, in a data center or IP-based context, for example, traffic between hosts might never leave a deployment unit, such that the tolerance for oversubscription can be greater than in environments such as a public switched telephone network (PSTN), where all traffic typically passes across each tier in the network. In the case of coordinated calculations, for example, hosts can primarily communicate with each other for a period of time such that much of the aggregation or core layers will not receive much if any traffic from those hosts. Conventional Clos principles do not take into account aspects such as the locality of traffic.

The approach discussed with respect to FIG. 5(*b*) thus can be thought of as using a crossbar to link together a pair of two-tier Clos networks, using a specific connection scheme, or taking a very structured three-tier Clos network (or multi-tier) and adding oversubscription into the layers of the network. In some embodiments, however, there can be different levels of oversubscription at different points in the data center network. For example, different deployment units can have different levels of oversubscription with respect to the crossbar, and thus can have different numbers of edge devices and host ports. In one example, a deployment unit could have redundant links for a customer paying for higher bandwidth. Different levels of oversubscription also could be used for other reasons, such as to handle different types of instances provisioned in the deployment units. Further, certain switches have intrinsic oversubscription, such as 3:2 oversubscription for certain 48 port switches, such that the choice of switch also can dictate the design of the data center to some extent.

Figure 6:
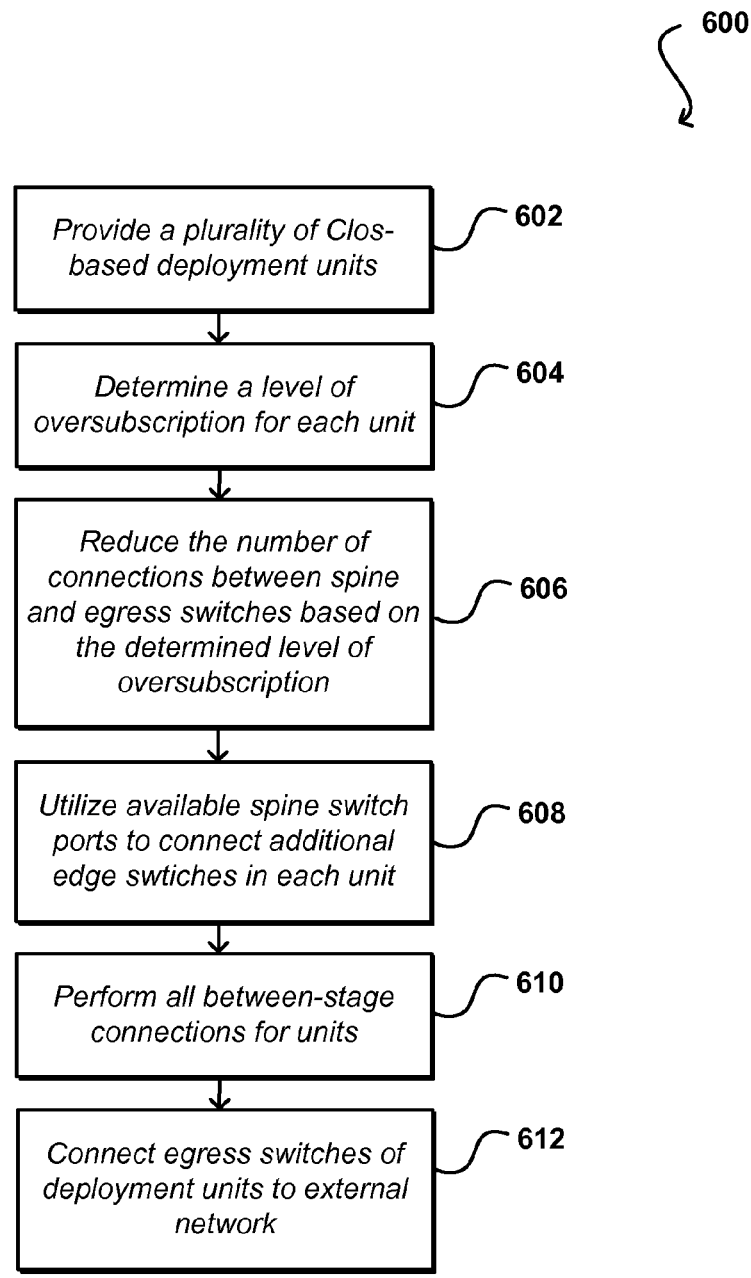
FIG. 6 illustrates an example process for implementing a network of Clos groups that can be used in accordance with various embodiments.

FIG. 6 illustrates an example process 600 for improving the efficiency of a Clos-based data center that can be used in accordance with one embodiment. In this example, a set of Clos-based deployment units (e.g., six replicated units) is provided, each being highly connected such that connections are only made between tiers and each device in a tier is capable of being connected to each device in an adjacent tier 602. A level of oversubscription at the spine switches of tier 2 of the deployment units is determined 604. Based at least in part upon the determined level of oversubscription, the number of connections to be made between the spine switches and the egress switches of each deployment unit can be reduced 606. Utilizing the open ports on the spine switches as a result of reducing the number of connections up to the egress switches, additional edge devices can be added to the deployment units that are capable of being fully connected to the spine switches using the newly available ports 608. All between-tier connections can be performed for each deployment unit, wherein each tier 1 switch is fully connected to each tier 2 switch, and each tier 2 switch is connected to at least one tier 1 egress switch 610. The egress switches of the deployment units can be connected to an external network using a crossbar 612, aggregation fabric, or other appropriate network or set of connection devices, which may also be Clos-based. It should be understood that for the various processes discussed herein, there can be fewer, additional, or alternative steps performed in varying orders, or in parallel, within the scope of the various embodiments.

Figure 5B:
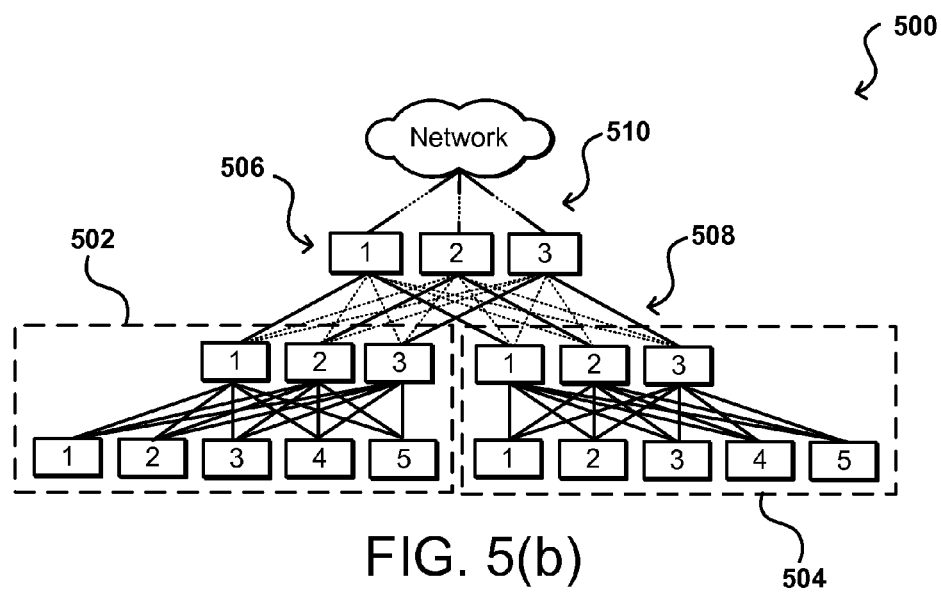

As was illustrated in FIG. 5(b), for example, core switches can be connected to each of the tier 2 devices in each of the deployment units. In some embodiments, however, at least some of the core switches could be connected directly to the tier 1 (edge) switches, as illustrated in the example configuration 700 of FIG. 7. The tier 2 (spine) switches in such a configuration then can be reserved to handle only local traffic within each deployment unit. The ports on the edge switches in this configuration thus are not fully populated with host devices, as in previous examples, as some of the ports are instead used to connect to the core switches (or aggregation fabric of other networking). The tier 3 switches 702 can be connected directly to the tier 1 switches 704, bypassing the tier 2 switches 706 which in this case only route traffic back and forth between the tier 1 switches. The cabling can be a little more complex, such as where each tier 1 switch is a TOR switch in a rack of host devices. Any traffic that goes from one deployment unit to the other, however, now does not go through any of the tier 2 switches. Such an approach does not take away any bandwidth away from the local traffic, and if each of the edge switches is connected to the core, such as by using a redundant link, then a significant number of extra buffers are added that can be used to prevent congestion events. In a configuration with 21 edge switches per deployment unit, the number of available buffers can approximately double if bypassing the tier 2 switches and instead connecting each edge switch. In a configuration with six such deployment units, there would be over 100 buffers available, which can be efficient for various traffic patterns.

Figure 7:
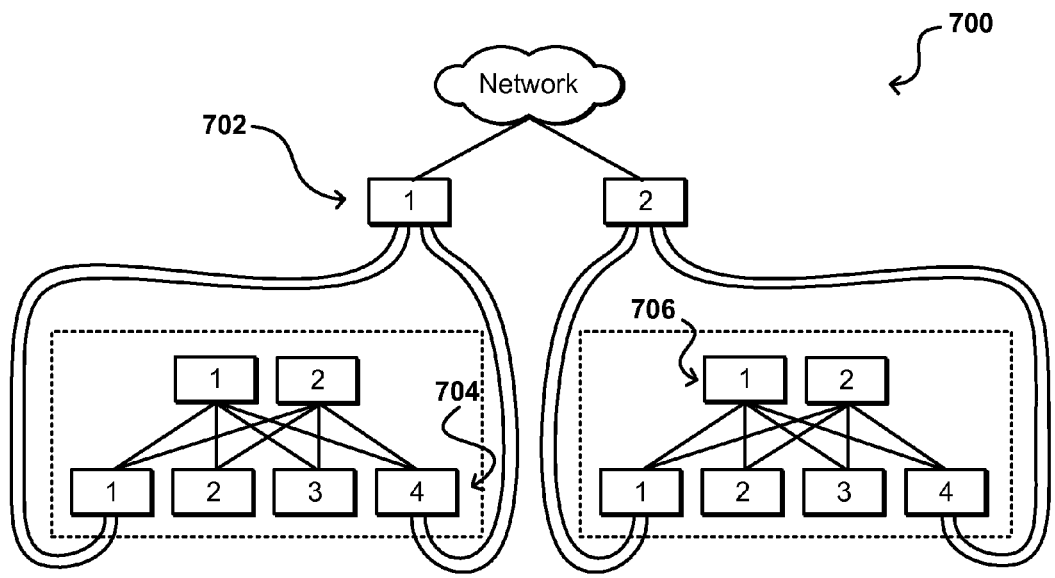
FIG. 7 illustrates an approach to connecting deployment units that can be used in accordance with various embodiments.

An advantage to an approach such as that described with respect to FIG. 7 is that the tier 3 switches can be connected directly to the tier 1 switches, which can be advantageous for certain types of traffic, such as where that traffic is destined for the computing devices connected to the tier 1 switches. In a conventional scenario, the traffic between deployment units passes through tiers 3 and 2 before arriving at tier 1, which ties up tier 2 with unnecessary traffic. Connecting the tier 3 switches directly to the tier 2 switches prevents tying up the bandwidth of the tier 2 switches with the traffic between tiers 1 and 3. Further, bypassing the tier 2 switches with such traffic enables the tier 2 bandwidth to be guaranteed for other traffic, particularly the traffic within the deployment unit. The guaranteed amount of tier 2 bandwidth also allows the system to be more deterministic about the available bandwidth for the tier 1 host traffic. Since traffic between deployment units does not go through tier 2, a customer can buy an entire deployment unit of capacity, with the guarantee that the customer will have the dedicated use of all interconnect within that deployment unit.

Another advantage of the approach described with respect to FIG. 7 is that cheaper switches, or switches with smaller buffers, can be used to handle bursts of traffic, which enables the bursts to be spread around to many more switches, as there typically will be many more tier 1 switches than tier 2 switches. Generally, there will be about twice as many tier 1 switches as tier 2 switches. Thus, if the spine and/or external links are divided over the tier 1 switches, the system can withstand a greater frequency and/or amount of bursts.

Figure 8:
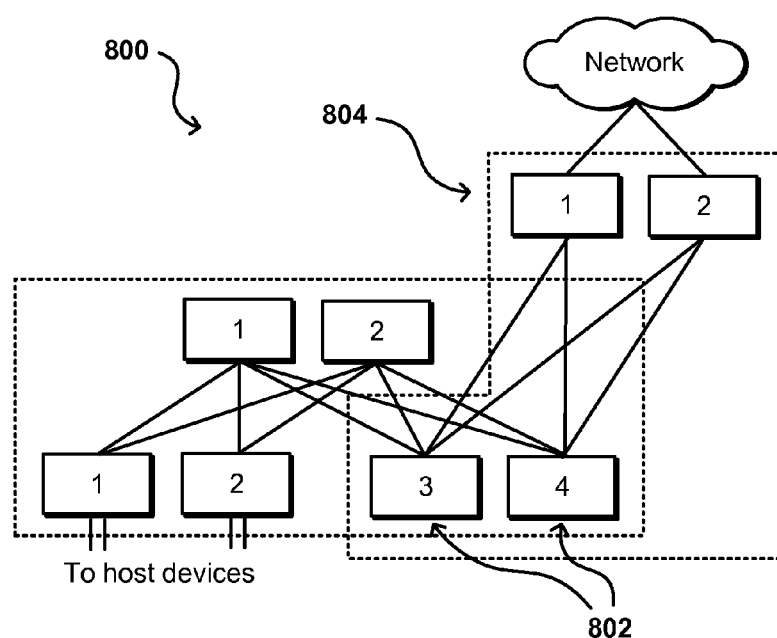
FIG. 8 illustrates an approach to fusing adjacent fabrics that can be used in accordance with various embodiments.

An approach in accordance with other embodiments can instead dedicate a portion of the edge or leaf switches of each deployment unit for purposes of connectivity between deployment units. As illustrated in the example configuration 800 of FIG. 8, a specified set of leaf switches 802 can be dedicated and utilized to fully connect to the core switches 804 or other such tier 3 devices. There can be host machines on many of the leaf switches, but two or more of the leaf switches can connect up to tier 3 switches 804 in various embodiments. In this example the dedicated switches 802 have no hosts attached, and are used purely for connectivity. One advantage to such an approach is that all the buffers in those switches are dedicated to connectivity, which might be advantageous for certain traffic patterns. Such an approach also helps with scaling efficiency in addition to buffer efficiency.

As can be seen, the dedicated leaf switches 802 and the core switches 804 essentially form a separate deployment unit, or a fully connected two-stage network. The two units are essentially fused, however, as the dedicated switches 802 are each shared between the fabrics of the deployment unit and the connecting fabric.

Thus, instead of spreading the links across all the tier 1 switches as in FIG. 7, two or more of the tier 1 switches can be dedicated to handle all of the connectivity out of the deployment unit (e.g., up to the tier 3 or spine switches). Such an approach may not provide the buffering benefits of FIG. 7, as the only buffers being used are the buffers on the dedicated switches, but an advantage can be obtained in that there can be dedicated bandwidth on those switches. There is no contention, as the dedicated switches are meant for connection traffic and there is no host traffic on those switches, since there are no directly-connected hosts. The system thus can be very precise as to the amount of bandwidth to be provided. Further, the resources on tier 2 do not have to be tied up for the traffic between deployment units. Thus, the system can guarantee the amount of connectivity within a deployment unit as well as between or otherwise outside the deployment units, and can guarantee the amount of exit bandwidth. A tradeoff between selecting the approaches of FIGS. 7 and 8 thus can involve whether the customer or system wants to optimize for buffering (to spread or localize the traffic) and whether to provide guarantees for intra- and/or inter-deployment unit traffic and/or bandwidth.

Figure 9A:
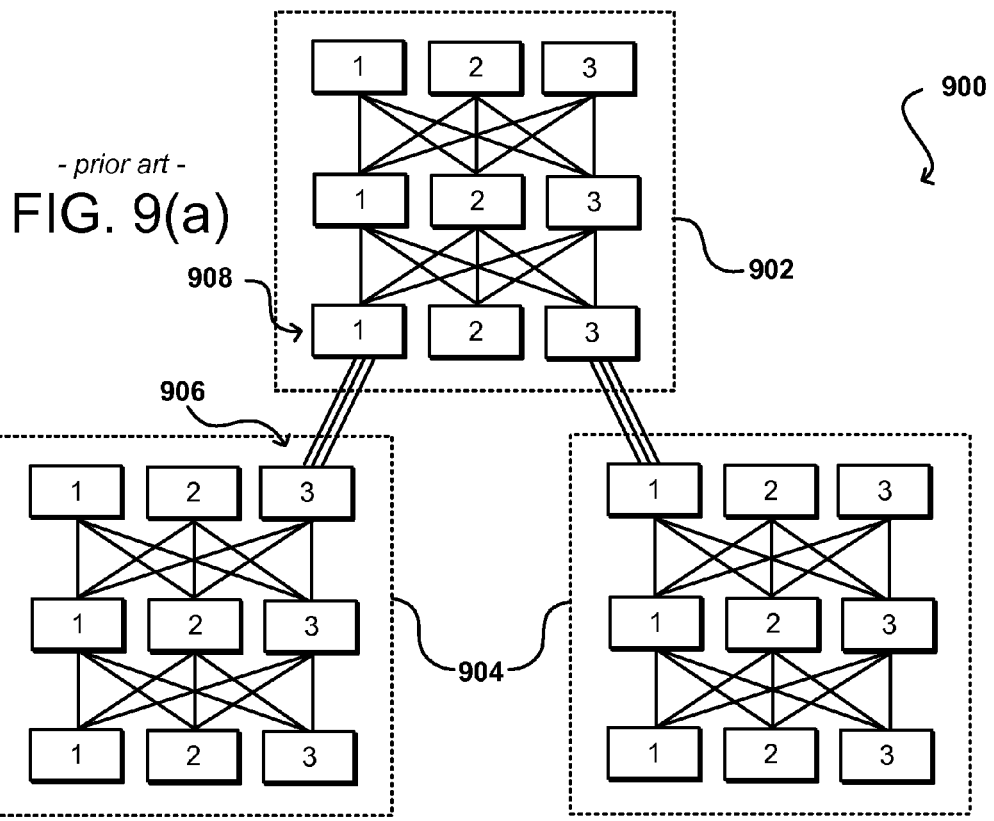
FIGS. 9(a) and 9(b) illustrate approaches to connecting Clos networks that can be used in accordance with various embodiments.

The concept of sharing switches can be extended to the deployment of a data center or IP-based network. As discussed above, a data center can be comprised of multiple deployment units or other such groupings, each of which can be based on a Clos-type network. In some cases, the deployment units can themselves be connected using one or more Clos network-type groupings, enabling the data center to be built using a set of similar network units. For example, FIG. 9(a) illustrates a conventional approach 900 wherein multiple Clos network groups 902, 904 can be combined to provide network connectivity for a plurality of hosts. In such networks, each Clos group can comprise an integrated circuit or other fixed device. Thus, the level of oversubscription, number of devices, or other such aspects cannot be changed within a grouping. As can be seen, the Clos groups can be connected by connecting one or more egress switches 906 of lower level Clos groups 904 with one or more edge switches 908 of an upper level Clos group 902, which might have egress switches connected to a higher level Clos group or external network, for example. Such an approach enables the data center to be built and/or scaled by adding additional Clos groups and connecting them appropriately.

While such an approach can provide for ease of scaling, there is some inefficiency built into such an approach. For example, consider the egress switch 906 of one of the lower level Clos groups 904 that is connected to the edge switch 908 of the higher level Clos group 902. The primary purpose of the connections between the devices is simply to transfer information from one leaf switch to another. This results in a redundancy for each connection, as a single switch could perform the functions performed by the separate switches in the separate Clos groups.

Figure 9B:
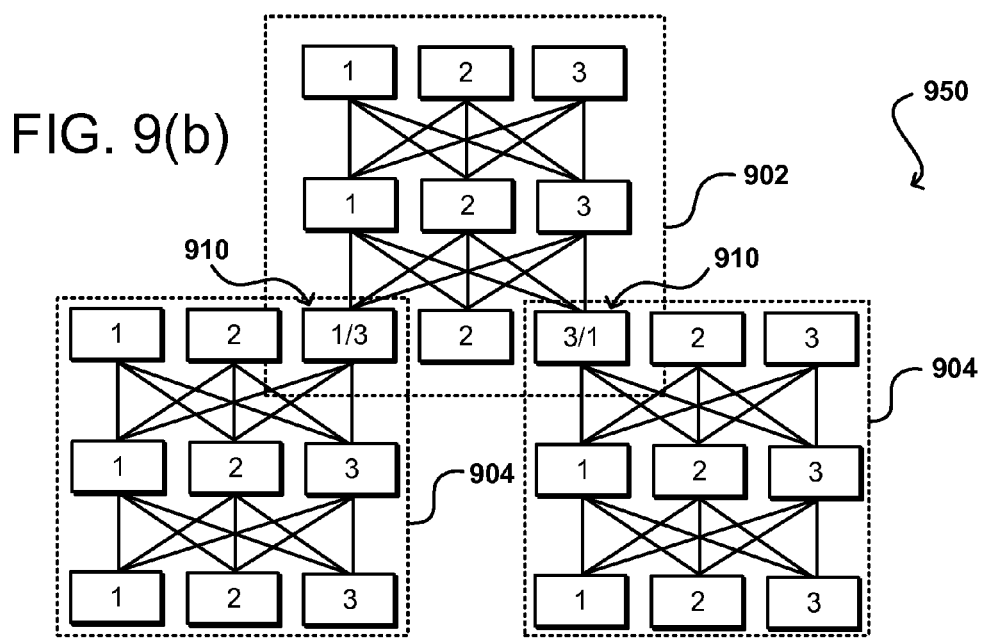

Systems and methods in accordance with various embodiments can eliminate this redundancy by utilizing a single switch 910 to effectively replace a pair of switches (and associated cabling) of the conventional approach, as illustrated in the example configuration 950 of FIG. 9(*b*). As discussed, the network groups can be built using several separate instances of commodity hardware that are then physically connected, such that computing devices can be added and removed as desired. One of the devices can be removed for each combination of Clos groups 902, 904, and a single switch 910 can effectively function as a leaf device for each pair of connected Clos groups 902, 904. These separate groups, or fabrics, are no longer "Clos" networks per se, but maintain many of the advantages of Clos networks as discussed above. The fabrics thus become fused together as the fabrics share at least one device, whereby the edges of the fabrics are fused and the fabrics are connected edge to edge. Each of the shared devices can actively participate in the two fused groups when the routing protocols are laid on top of the shared device. Such an approach enables the hierarchy of two-tier network groups to be scaled while optimizing on the number of necessary switches.

While the example shown has a limited number of switches for purposes of simplicity, it should be understood that the ability to fuse fabrics can save a significant number of switches as opposed to using conventional Clos groupings. For example, two tier Clos network based on 24-port switches will have 288 host ports. The design must typically be created up front with these host ports in mind. If a customer wants to add more ports, such as an additional 12 ports to have a total of 300, the conventional approach would require moving to a three-tier, five-stage Clos network. A three-tier network, however, will require 720 24-port switches, and will handle 3,456 host connections. Thus, for twelve additional switches the network must add infrastructure to handle 3,456 connections.

Systems and methods in accordance with various embodiments instead can utilize multiple Clos-based network groups, but effectively "fuse" at least some of those groups in order to reduce the necessary number of devices. Further, oversubscription can be introduced to these fused Clos-based groups to further reduce the necessary number of network devices per host connection.

The approach described with respect to FIG. 9(*b*) can be beneficial in many situations, but can have some potential disadvantages. For example, in the design some switches will be part of two network groups at the same time, which can potentially lead to confusion with respect to the cabling, replacement, and maintenance of the network. Further, in the configuration of FIG. 9(*b*) there are still two egress switches in each of the lower Clos groups that are not fused with the upper group, such that these either need to be fused or connected to another group or fabric. In some cases these egress switches could instead be used as edge switches to provide host connections, but then each Clos group only has one egress switch to enable traffic to leave the group, which can lead to problems with congestion events, etc., in some circumstances.

Figure 10:
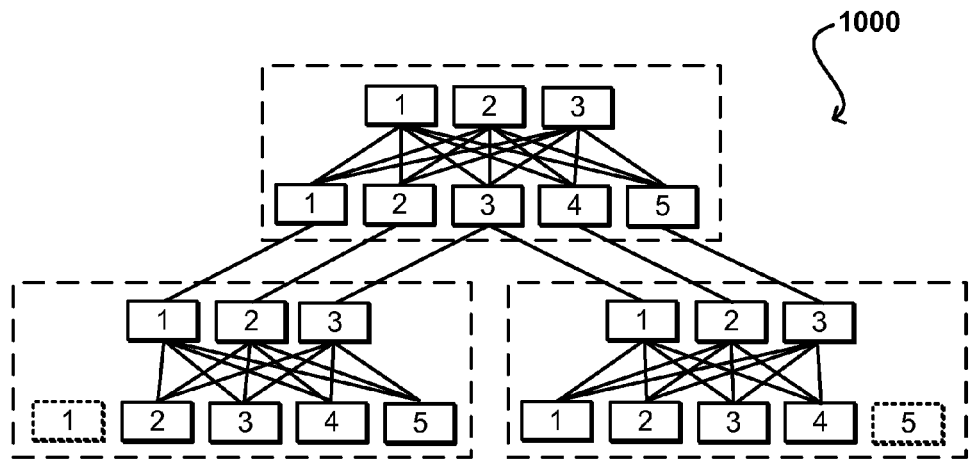
FIG. 10 illustrates an approach to fusing Clos groups that can be used in accordance with various embodiments.

As discussed, one approach is to fuse each of the egress switches of a lower Clos group with one of edge switches of an upper Clos group. When doing this, the lower Clos group would effectively have only two stages that only belong to that group: the edge switches and the spine switches. The egress switches would effectively be part of the upper group as well. As illustrated in the example configuration 1000 of FIG. 10, the grouping of the deployment units or "Clos groups" can then be adjusted such that there are a plurality of "network blocks" that each include two stages of devices. As can be seen, since the egress switches are shared with the edge switches of a block to be connected "above" each network block, the blocks can effectively be deployed with only two stages of devices. Thus, the number of devices needed for each host connection is reduced.

A further advantage, however, is that network blocks can be added as needed to increase the number of host connections, but the blocks are each smaller than conventional Clos networks. The smaller blocks also can provide added flexibility. For example, the configuration in FIG. 10 allows for oversubscription. For six port switches as used in the example, the three spine switches can each connect to one of the edge/egress switches in the upper block, while still being fully connected to four edge devices in the same network block. Thus, a network can be scaled using building blocks of two-tier network groups, with some of the tier 1 switches being removed to provide links and bandwidth to connect to other deployment units. And the connectivity to the other deployment units can itself also be another two-tier Clos-type network. The approach thus allows for an arbitrary nesting of two-tier Clos-type network groups.

Figure 11:
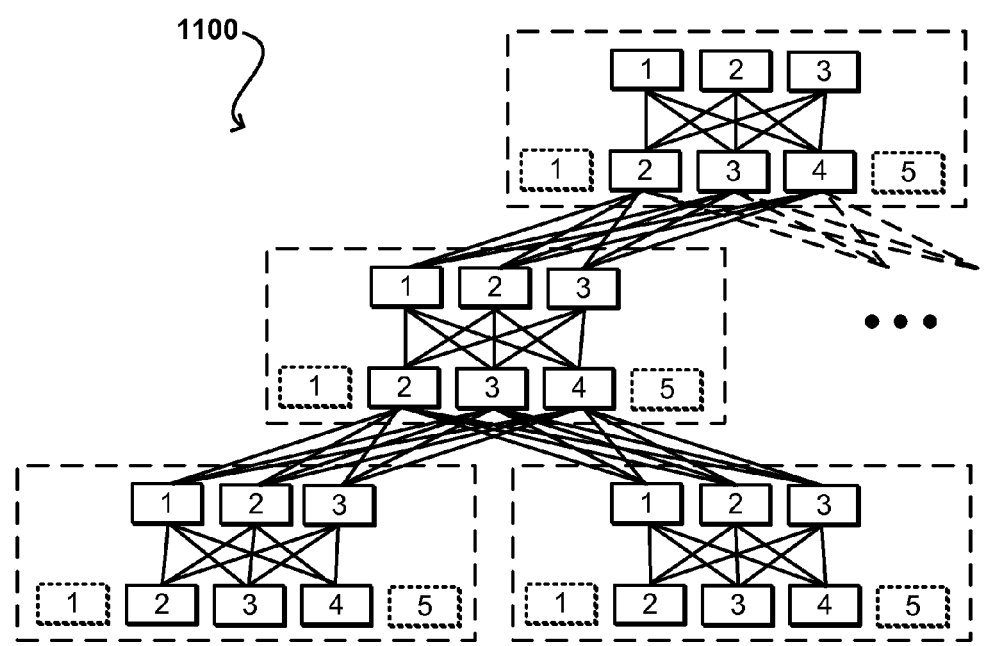
FIG. 11 illustrates an approach to fusing Clos groups that can be used in accordance with various embodiments.

As illustrated in the example configuration 1100 of FIG. 11, the spine switches can be fully connected to the edge switches in the upper block, and fully connected to the edge switches in the same block, to essentially form a fully connected Clos network but effectively eliminating a full stage of devices. The network is scaled by providing a nested hierarchy of two-stage Clos-type network groups.

Further, as shown in FIG. 11, the network blocks can be stacked as needed to scale the network, without the need to provide a full Clos deployment. The level of oversubscription can be used to control the width of a hid radix network or similar fat tree network at each level. All the network blocks or "containers" can be identical in various embodiments, such that the addition of any number of blocks would be straightforward and each could be connected using the same approach. In other embodiments, however, there can be different type of blocks that can be connected, such that different levels of oversubscription, connectivity, and other such aspects can be provided as desired.

Figure 12:
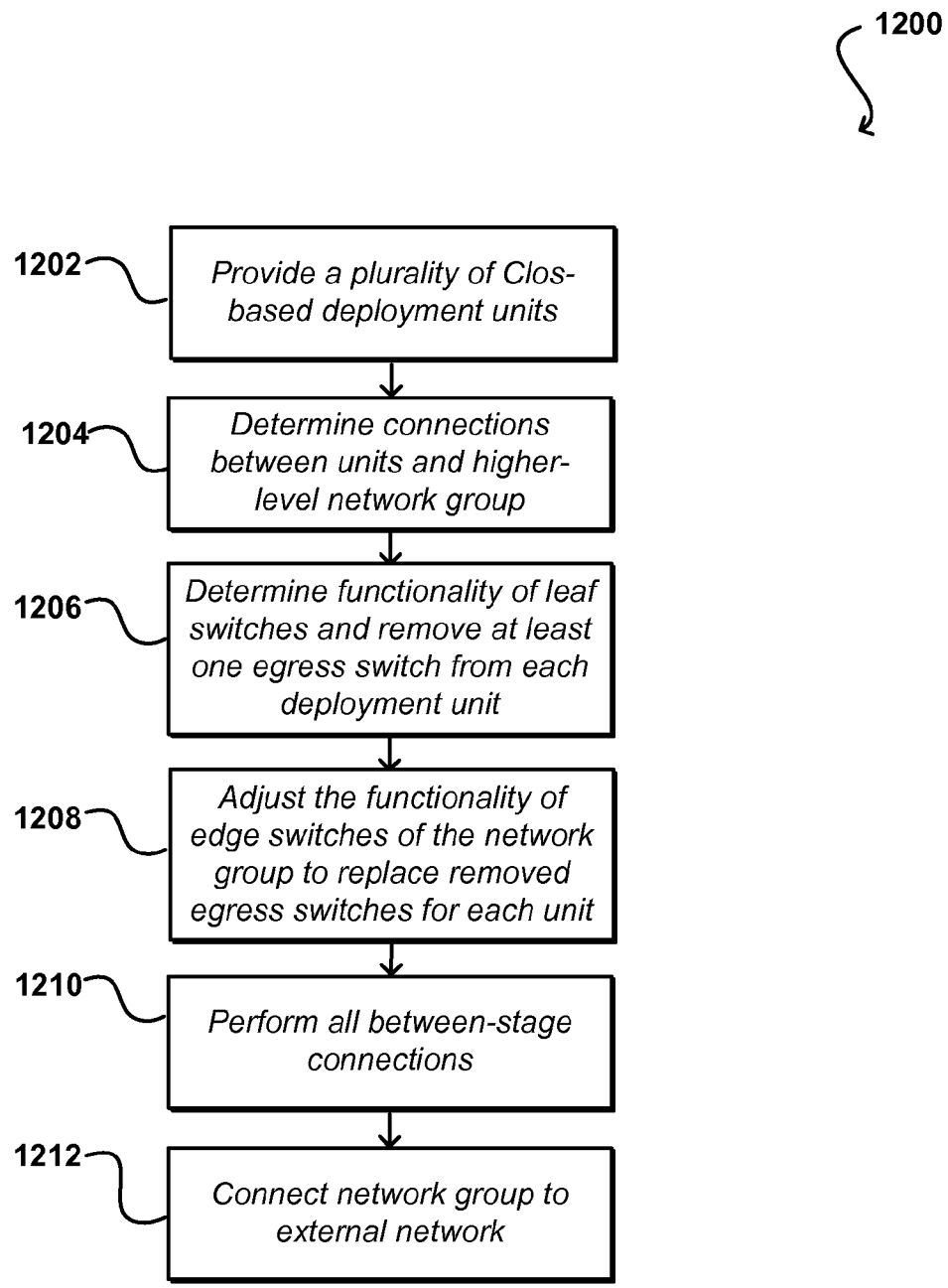
FIG. 12 illustrates an example process for implementing a network of Clos groups that can be used in accordance with various embodiments.

FIG. 12 illustrates an example process 1200 for improving the efficiency of a Clos-based data center that can be used in accordance with one embodiment. In this example, a set of Clos-based deployment units (e.g., six replicated units) is provided, each being highly connected such that connections are only made between stages and each device in a stage is capable of being connected to each device in an adjacent stage 1202. The connections between each deployment unit and a higher-level network group are determined 1204. In some embodiments, this higher-level network group may also be a Clos-based deployment unit. Based at least in part upon the functionality of the leaf switches in the deployment units and the higher-level network group, at least one of the egress switches of each deployment can be removed and the functionality replaced by one of the edge switches of the higher-level network group 1206. The functionality of each such edge switch can be adjusted such that the edge switch functions as both an edge switch in the higher-level network group and an egress switch in the respective deployment unit 1208. All between stage connections are made for each deployment unit 1210, wherein each device is connected to a device in an adjacent tier using at least one connection. The egress switches (or other such devices) of the higher-level network group can be connected to an external network using a crossbar, aggregation fabric, or other appropriate network or set of connection devices, which may also be Clos-based 1212. Various alternatives and variations exist within the scope of the various embodiments.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of connecting switches in a data network, comprising:

providing at least one upper level deployment unit and at least two lower level deployment units, each deployment unit comprising a first tier of switches and a second tier of switches, the first tier switches in a deployment unit being connected to each of the second tier switches in the deployment unit using only connections between tiers, each deployment unit capable of including a first number of first tier switches being fully connected to the second tier switches in the deployment unit;

deploying only a second number of first tier switches in the lower level deployment units, the second number of first tier switches being less than the first number of first tier switches such that ports are available on the second tier switches in the lower level deployment units; and connecting each of the lower level deployment units to at least one first tier switch in at least one upper level deployment unit using one of the available ports from the second tier switches, wherein the connectivity between an upper deployment unit and a lower deployment unit is provided by a second tier switch of the lower deployment unit.

2. The method of claim 1, wherein the deployment units are able to be connected using fewer switches than would be necessary using a conventional high radix network.

3. The method of claim 1, wherein at least a portion of the first tier of switches of a lower level deployment unit is capable of connecting to at least one computing device.

4. The method of claim 1, wherein each deployment unit comprises a Clos network.

5. The method of claim 1, wherein each deployment unit comprises a butterfly network or dragonfly network.

6. The method of claim 1, wherein each of the switches is a commodity network switch or application-specific integrated circuit (ASIC).

7. The method of claim 1, wherein a portion of the first tier switches are top of rack (TOR) switches connected to a plurality of host devices in a network rack.

8. The method of claim 1, wherein the at least one upper level deployment group is connected to an external network using a high radix interconnection network.

9. A method of connecting switches in a data network, comprising:

providing at least one top level deployment unit, at least one middle level deployment unit, and at least two bottom level deployment units in a hierarchical network layout, each deployment unit comprising at least a first tier of switches and a second tier of switches, the first tier switches in a deployment unit being connected to each of the second tier switches in the deployment unit using only connections between tiers, each deployment unit capable of including a first number of first tier switches being fully connected to the second tier switches in the deployment unit, each of the first tier switches in the bottom level deployment units capable of connecting to at least one computing device;

deploying only a second number of first tier switches in the bottom level deployment units, the second number of first tier switches being less than the first number of first tier switches such that ports are available on the second tier switches in the bottom level deployment units to connect to the at least one middle level deployment unit;

deploying only a third number of first tier switches in the middle level deployment unit, the third number of first tier switches being less than the first number of first tier switches such that ports are available on the second tier switches in the middle level deployment unit to connect to the at least one top level deployment unit; and connecting the at least one top level deployment unit and the at least two bottom level deployment units using the at least one middle level deployment unit, wherein connectivity between deployment units at different levels is provided by at least one fully connected deployment unit.

10. The method of claim 9, wherein the deployment units are able to be connected using fewer switches than would be necessary using a conventional high radix network.

11. The method of claim 9, wherein each deployment unit comprises a Clos network.

12. The method of claim 9, wherein each of the switches is a commodity network switch or application-specific integrated circuit (ASIC).

13. The method of claim 9, wherein a portion of the first tier switches are top of rack (TOR) switches connected to a plurality of host devices in a network rack.

\* \* \* \* \*